(12) United States Patent
Tseng et al.

(10) Patent No.: US 7,238,897 B2
(45) Date of Patent: Jul. 3, 2007

(54) CONTACT SENSOR AND METHOD FOR MAKING THE SAME

(75) Inventors: Ching-Chung Tseng, Kaohsiung Hsien (TW); Chung-Chi Yang, Kaohsiung (TW); Hsiu-Chung Lin, Kaohsiung (TW); Chun-I Kao, Kaohsiung Hsien (TW); Hsiang-Hsin Kuo, Kaohsiung (TW)

(73) Assignee: Taiwan IC Packaging Corporation, Kaohsiung (TW)

( * ) Notice: Subject to any disclaimer, the term of this patent is extended or adjusted under 35 U.S.C. 154(b) by 20 days.

(21) Appl. No.: 11/295,448

(22) Filed: Dec. 7, 2005

(65) Prior Publication Data

US 2007/0125632 A1    Jun. 7, 2007

(51) Int. Cl.
*H01H 21/54* (2006.01)
(52) U.S. Cl. .............. 200/16 R; 200/81 R; 250/208.1; 257/434; 257/680
(58) Field of Classification Search ............. 200/16 R, 200/81 R, 83 R, 83 A; 250/208.1, 239, 261; 257/433–434, 444, 680–686; 438/116
See application file for complete search history.

(56) References Cited

U.S. PATENT DOCUMENTS

| | | | | |
|---|---|---|---|---|
| 4,838,089 A | * | 6/1989 | Okada et al. .................. 73/727 |
| 5,523,608 A | * | 6/1996 | Kitaoka et al. ............. 257/433 |
| 6,060,729 A | * | 5/2000 | Suzuki et al. ................. 257/99 |
| 6,559,539 B2 | * | 5/2003 | Tu et al. ...................... 257/723 |
| 6,661,089 B2 | * | 12/2003 | Huang ......................... 257/704 |
| 6,791,076 B2 | * | 9/2004 | Webster ...................... 250/239 |
| 2002/0096763 A1 | * | 7/2002 | Ho et al. ..................... 257/729 |

* cited by examiner

*Primary Examiner*—K. Lee
(74) *Attorney, Agent, or Firm*—Birch, Stewart, Kolasch & Birch, LLP

(57) ABSTRACT

A contact sensor includes a base, a wall device securely attached to the top face of the base and having a hole defined in the wall device to correspond to the top contacts so as to allow the top contacts of the base to be exposed and a chip receiving space defined to communicate with the hole, a sensing chip received in the chip receiving space and having a sensing area formed on top of the sensing chip and contacts formed thereon to electrically connect to the top contacts of the base and a cover received in the hole to enclose the contacts of the sensing chip and the top contacts of the base yet still allowing the sensing area exposed for application.

20 Claims, 4 Drawing Sheets

CONTACT SENSOR AND METHOD FOR MAKING THE SAME

BACKGROUND OF THE INVENTION

1. Field of the Invention

The present invention relates to a contact sensor and the method for making such a contact sensor, and more particularly to the contact sensor manufacturing method to avoid breakage of the sensing chip during encapsulating process in a mold.

2. Description of Related Art

A conventional contact sensor normally is applied to a computer screen, a mouse, a fingerprint identification device . . . etc. and has a base with a conductive element mounted on the ground of the base, a sensing chip securely adhered to the base to have electrical connection to the base via wires and an encapsulation encompassing the combination of the base, the conductive element and the sensing chip but still allowing the sensing area of the sensing chip as well as the conductive element to be exposed for potential application.

With this kind of configuration, it is noted that during the encapsulating process, the combination of the base and the sensing chip is placed into a mold for encapsulation. In order to prevent the sensing chip from being contaminated by the encapsulation due to overflow, it is necessary to apply a force to the mold to constrain the encapsulation from overflowing. Because the sensing chip is very fragile and thin, the force applied to the mold will easily damage the sensing chip, which causes unusual high product defect rate.

To overcome the shortcomings, the present invention tends to provide an improved contact sensor to mitigate the aforementioned problems.

SUMMARY OF THE INVENTION

The primary objective of the present invention is to provide a contact sensor, which requires no encapsulation process to the sensing chip and still protects integrity of the entire structure.

In order to accomplish the objective, the contact sensor of the present invention is composed of a base, a wall device mounted on top of the base and having a chip receiving space defined in the wall device and a indentation defined to communicate with the chip receiving space, a sensing chip securely received in the chip receiving space and a cover securely received in the indentation so that the cover is able to protect contacts of the base and the sensing chip.

In addition, connection wires are provided to electrically connect the contacts of the base and the contacts of the sensing chip. Also, the connection wires are provided with insulation material outside the connection wires to avoid short between the contacts of the base and of the sensing chip.

Other objects, advantages and novel features of the invention will become more apparent from the following detailed description when taken in conjunction with the accompanying drawings.

DETAILED DESCRIPTION OF THE PREFERRED EMBODIMENT

Figure 1:
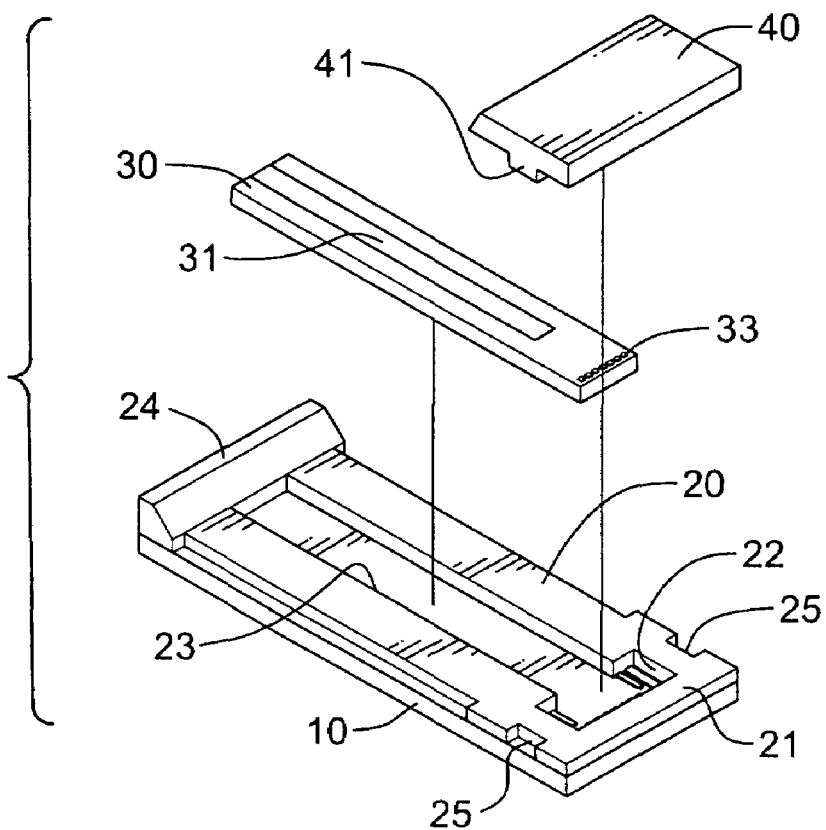
FIG. 1 is an exploded perspective view of the contact sensor of the present invention.
Figure 2:
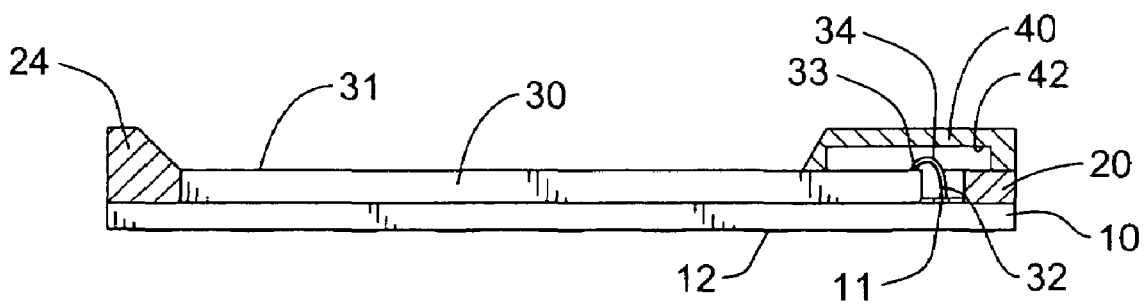
FIG. 2 is a cross sectional view showing the combination of the contact sensor.
Figure 3:
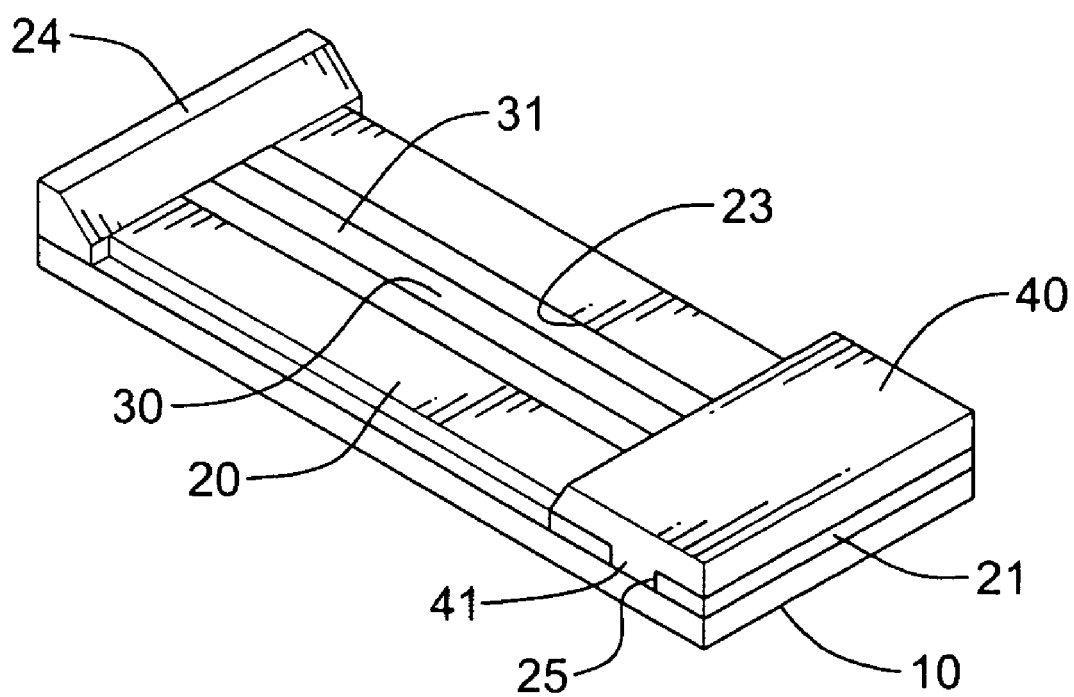
FIG. 3 is a perspective view of the contact sensor.

With reference to FIGS. 1 to 3, it is noted that the contact sensor in accordance with the present invention includes a base (10), a wall device (20), a sensing chip (30) and a cover (40).

The base (10) has a plurality of top contacts (11) formed on a top face thereof to contact with the sensing chip (30) and bottom contacts (12) formed on a bottom face thereof to electrically connect to the top contacts (11) for further application.

The wall device (20) is securely engaged with the top face of the base (10) and includes a cover connection portion (21) to connect to the cover (40), a hole (22) defined in a front portion thereof to allow the top contacts (11) of the base (10) to be exposed after the wall device (20) is mounted on top of the base (10), a chip receiving space (23) defined to receive therein the sensing chip (30) and to communicate with the hole (22), a wall (24) formed on a side face of the wall device (20) and a cutout (25) defined in two opposed side faces of the wall device (20).

The sensing chip (30) is received in the chip receiving space (23) of the wall device (20) and includes a sensing area (31) formed on a top face thereof and contacts (33) formed on a side face thereof to connect to the top contacts (11) of the base (10) via connection wires (32) after the sensing chip (30) is received in the chip receiving space (23) of the wall device (20). It is noted that in order to prevent a short in the connection between the contacts (33) of the sensing chip (30) and the top contacts (11) of the base (10), an insulation layer (34), preferably made of epoxy, silicone or the like, is applied to the connection wires (32).

The cover (40) is received in the hole (22) of the cover connection portion (21) of the wall device (20) such that the cover (40) is able to enclose the contacts (33) of the sensing chip (30), the top contacts (11) of the base (10) and also the connection wires (32) used to connect the contacts (33) to the top contacts (11). The cover (40) includes a connection boss (41) formed on two opposed side faces of a bottom face thereof to correspond to and be received in the two cutouts (25) of the wall device (20) and a countersunk recess (42) defined in the bottom face thereof such that after the cover (40) is received in the corresponding hole (22) of the cover connection portion (21), the connection wires (32) are not damaged, as shown in FIG. 2.

Figure 4:
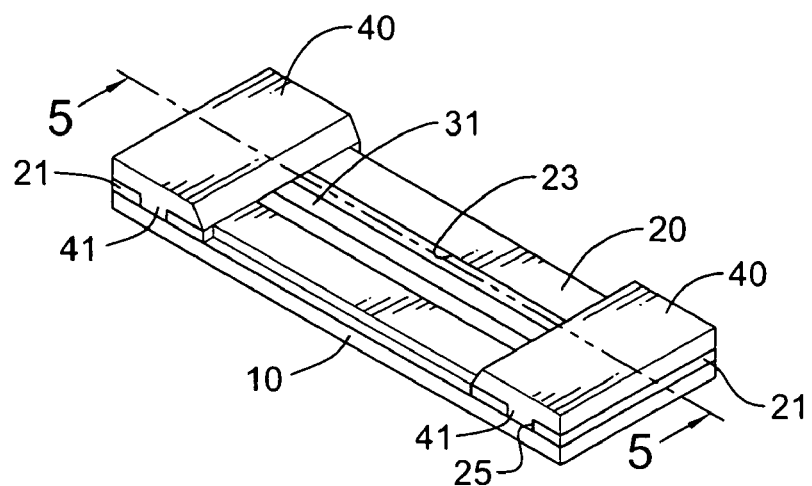
FIG. 4 is a perspective view of the contact sensor of the present invention in a different embodiment.
Figure 5:
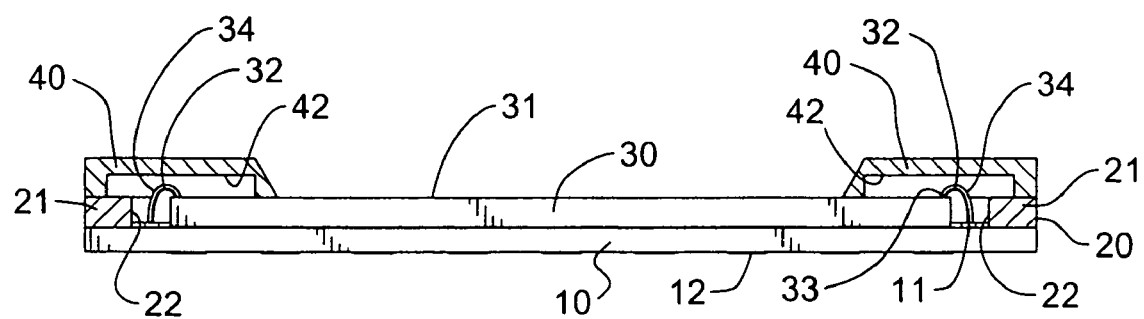
FIG. 5 is a cross sectional view of the contact sensor taken by line 5—5 in FIG. 4.

With reference to FIGS. 4 and 5, a different embodiment of the present invention is shown, wherein the contact sensor in accordance with the present invention includes a base (10), a wall device (20), a sensing chip (30) and two covers (40).

The base (10) has a plurality of top contacts (11) formed on a top face thereof to contact with the sensing chip (30) and bottom contacts (12) formed on a bottom face thereof to electrically connect to the top contacts (11) for further application.

The wall device (20) is securely engaged with the top face of the base (10) and includes a cover connection portion (21) provided on two opposed sides of the wall device (20) to connect to a corresponding one of the covers (40), a hole

(22) defined in the two opposed sides of the wall device (20) to allow the top contacts (11) of the base (10) to be exposed after the wall device (20) is mounted on top of the base (10), a chip receiving space (23) defined to receive therein the sensing chip (30) and to communicate with the holes (22) and a cutout (25) defined in two opposed side faces of the wall device (20).

The sensing chip (30) is received in the chip receiving space (23) of the wall device (20) and includes a sensing area (31) formed on a top face thereof and contacts (33) formed on a side face thereof to connect to the top contacts (11) of the base (10) via connection wires (32) after the sensing chip (30) is received in the chip receiving space (23) of the wall device (20). It is noted that in order to prevent a short in the connection between the contacts (33) of the sensing chip (30) and the top contacts (11) of the base (10), an insulation layer (34), preferably made of epoxy, silicone or the like, is applied to the connection wires (32).

Each cover (40) is received in the hole (22) of the cover connection portion (21) of the wall device (20) such that the cover (40) is able to enclose the contacts (33) of the sensing chip (30), the top contacts (11) of the base (10) and also the connection wires (32) used to connect the contacts (33) to the top contacts (11). The cover (40) includes a connection boss (41) formed on two opposed side faces of a bottom face thereof to correspond to and be received in the two cutouts (25) of the wall device (20) and a countersunk recess (42) defined in the bottom face thereof such that after the cover (40) is received in the corresponding hole (22) of the cover connection portion (21), the connection wires (32) are not damaged.

Figure 6:
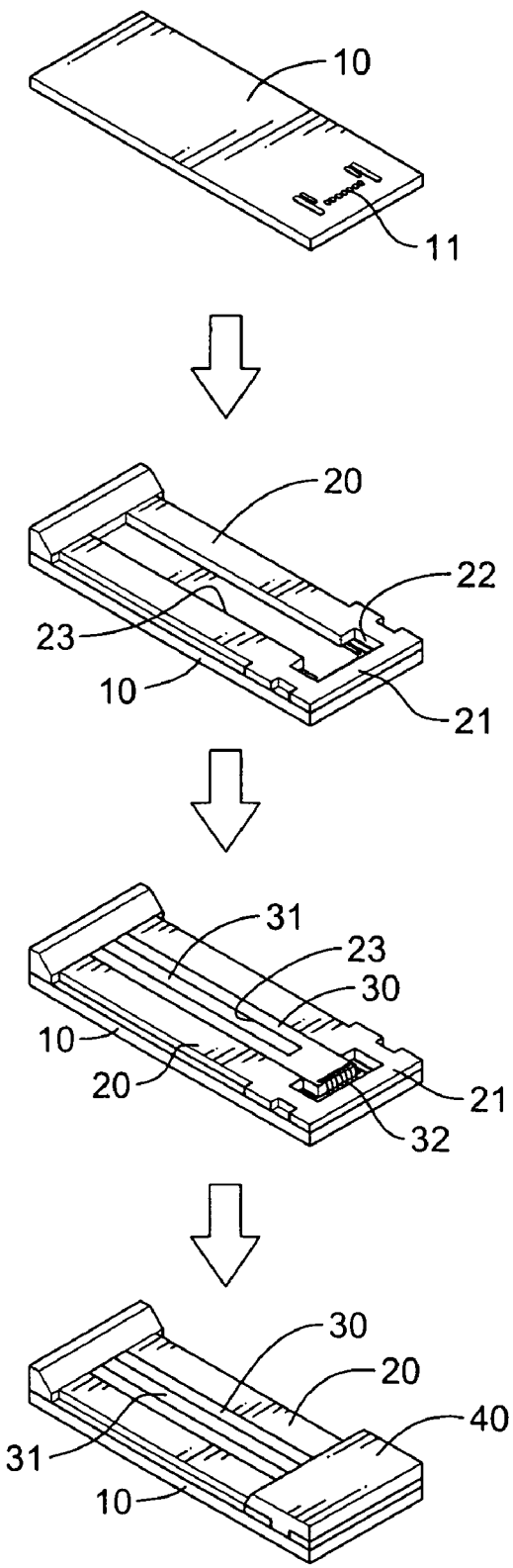
FIG. 6 shows the steps of forming the contact sensor of the present invention.

With reference to FIG. 6, it is noted that the method of the present invention includes the following steps:

preparing a base (10) having top contacts (11) formed on a top face of the base (10) and extending to a bottom face thereof to form bottom contacts (12);

attaching a wall device (20) on the top face of the base (10), the wall device (20) having two cover connection portions (21) formed on two opposed sides of the wall device (20) to correspond to the top contacts (11) of the base (10) so as to expose the top contacts (11) after the wall device (20) is attached to the top face of the base (10), a hole (22) defined in each of the cover connection portions (21), a chip receiving space (23) in communication with the holes (22) and two cutouts (25) defined in two opposed sides of the wall device (20);

providing a sensing chip (30) to be received in the chip receiving space (23) of the wall device (20), the sensing chip (30) having contacts (33) formed on two sides of the sensing chip (30) to be opposite to each other and to be respectively received in a corresponding one of the holes (22) so as to connect to the top contacts (11) of the base (10);

electrically connecting the contacts (33) of the sensing chip (30) to the top contacts (11) of the base (10) via connection wires (32);

providing an insulation layer (34) to the connection wires (32) to prevent a short between the contacts (33) of the sensing chip (30) and the top contacts (110 of the base (10); and enclosing the contacts (33) of the sensing chip (30) and the connection wires (32) via a cover (40) which is received in the hole (22) of the wall device (20).

Because the wall device (20) which is mounted on top of the base (10) replaces the need for encapsulation process, the requirement of applying a force to the mold is no longer necessary such that the damage to the sensing chip (30) is mitigated.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A contact sensor comprising:
    a base having top contacts formed on a top face thereof and bottom contacts formed on a bottom face thereof to electrically connect to the top contacts;
    a wall device securely attached to the top face of the base and having a hole defined in the wall device to correspond to the top contacts so as to allow the top contacts of the base to be exposed and a chip receiving space defined to communicate with the hole;
    a sensing chip received in the chip receiving space and having a sensing area formed on top of the sensing chip and contacts formed thereon to electrically connect to the top contacts of the base; and
    a cover received in the hole to enclose the contacts of the sensing chip and the top contacts of the base yet still allowing the sensing area exposed for application.

2. The contact sensor as claimed in claim 1, wherein connection wires are provided to connect the contacts of the sensing chip and the top contacts of the base.

3. The contact sensor as claimed in claim 2, wherein an insulation material is provided to the connection wires to prevent a short between the contacts of the sensing chip and the top contacts of the base.

4. The contact sensor as claimed in claim 3, wherein a wall is formed on a side of the wall device.

5. The contact sensor as claimed in claim 4, wherein the cover has a connection boss formed on two opposed sides of a bottom face of the cover to correspond to two cutouts defined in two opposed sides of the wall device so that after the cover is received in the hole of the wall device, the cover is secured relative to the wall device as well as the base.

6. The contact sensor as claimed in claim 2, wherein the cover has a countersunk recess in communication with the hole of the wall device so as to receive therein the connection wires.

7. The contact sensor as claimed in claim 3, wherein the cover has a countersunk recess in communication with the hole of the wall device so as to receive therein the connection wires.

8. The contact sensor as claimed in claim 4, wherein the cover has a countersunk recess in communication with the hole of the wall device so as to receive therein the connection wires.

9. The contact sensor as claimed in claim 5, wherein the cover has a countersunk recess in communication with the hole of the wall device so as to receive therein the connection wires.

10. A contact sensor comprising:
    a base having top contacts formed on a top face thereof and bottom contacts formed on a bottom face thereof to electrically connect to the top contacts;
    a wall device securely attached to the top face of the base and having two holes respectively defined in opposed sides of the wall device to correspond to the top contacts so as to allow the top contacts of the base to be exposed and a chip receiving space defined to communicate with the holes;

a sensing chip received in the chip receiving space and having a sensing area formed on top of the sensing chip and contacts formed thereon to electrically connect to the top contacts of the base; and two covers each received in a corresponding one of the holes to enclose the contacts of the sensing chip and the top contacts of the base yet still allowing the sensing area exposed for application.

11. The contact sensor as claimed in claim 10, wherein connection wires are provided to connect the contacts of the sensing chip and the top contacts of the base.

12. The contact sensor as claimed in claim 11, wherein an insulation material is provided to the connection wires to prevent a short between the contacts of the sensing chip and the top contacts of the base.

13. The contact sensor as claimed in claim 12, wherein each cover has a connection boss formed on two opposed sides of a bottom face of the cover to correspond to two cutouts defined in two opposed sides of the wall device so that after the cover is received in the hole of the wall device, the cover is secured relative to the wall device as well as the base.

14. The contact sensor as claimed in claim 11, wherein each of the covers has a countersunk recess in communication with the hole of the wall device so as to receive therein the connection wires.

15. The contact sensor as claimed in claim 12, wherein each of the covers has a countersunk recess in communication with the hole of the wall device so as to receive therein the connection wires.

16. The contact sensor as claimed in claim 13, wherein each of the covers has a countersunk recess in communication with the hole of the wall device so as to receive therein the connection wires.

17. A method for making a contact sensor comprising steps of:

preparing a base having top contacts formed on a top face of the base and extending to a bottom face thereof to form bottom contacts;

attaching a wall device on the top face of the base, the wall device having a cover connection portion formed on a side of the wall device to correspond to the top contacts of the base so as to expose the top contacts after the wall device is attached to the top face of the base, a hole defined in the cover connection portions, a chip receiving space in communication with the holes and two cutouts defined in two opposed sides of the wall device;

providing a sensing chip to be received in the chip receiving space of the wall device, the sensing chip having contacts formed on two sides of the sensing chip to be opposite to each other and to be respectively received in a corresponding one of the holes so as to connect to the top contacts of the base;

electrically connecting the contacts of the sensing chip to the top contacts of the base via connection wires; and enclosing the contacts of the sensing chip and the connection wires via a cover which is received in the hole of the wall device.

18. The method as claimed in claim 17 further comprising a step of providing an insulation layer to the connection wires to prevent a short between the contacts of the sensing chip and the top contacts of the base after the electrical connection step.

19. The method as claimed in claim 17, wherein the wall device has a wall integrally formed on top of the wall device.

20. The method as claimed in claim 18, wherein the wall device has a wall integrally formed on top of the wall device.

\* \* \* \* \*